Dec. 11, 1951 R. C. GANNON 2,578,131
COMBINATION EARTH SCRAPER AND SCARIFIER
Filed April 5, 1948 2 SHEETS—SHEET 1

INVENTOR.
ROY C. GANNON
BY
James B. Christie
ATTORNEY

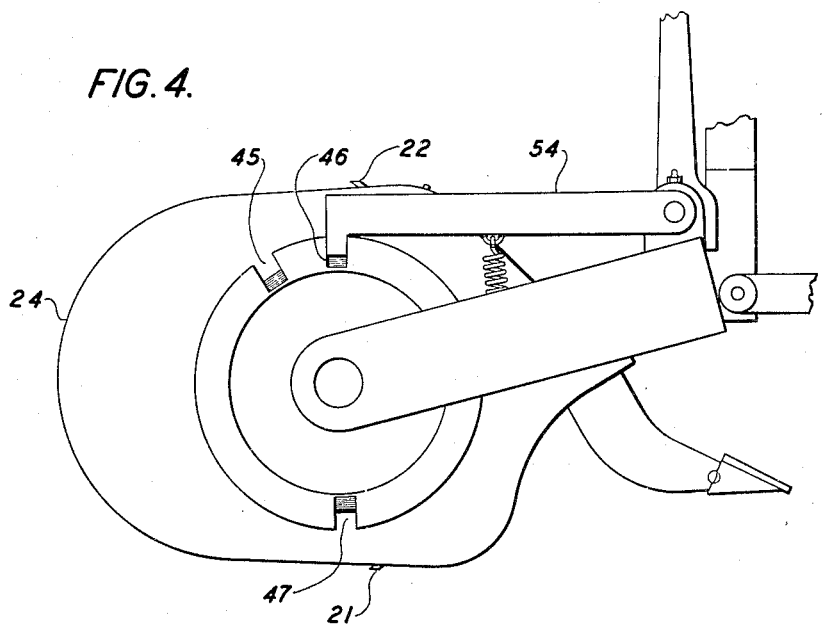
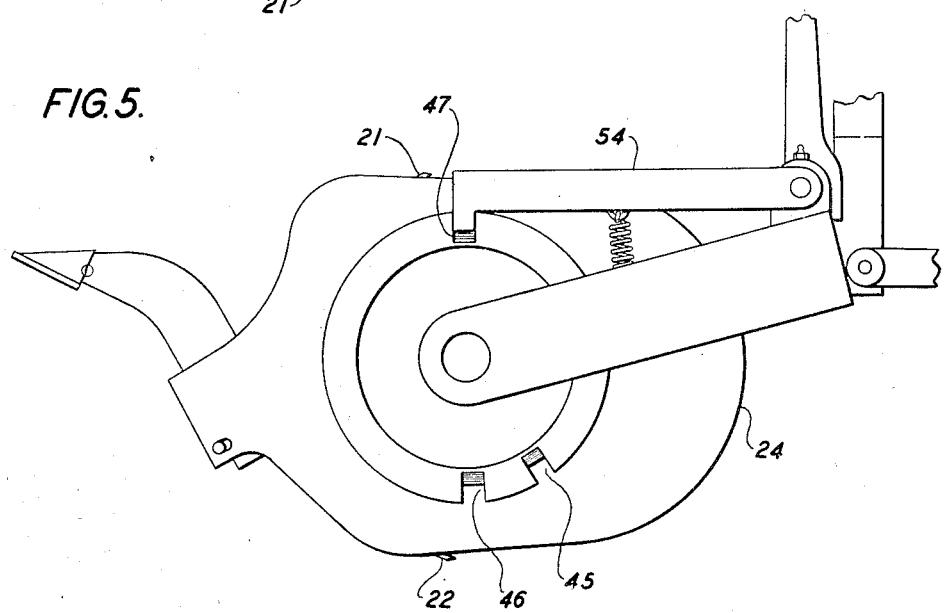

Patented Dec. 11, 1951

2,578,131

UNITED STATES PATENT OFFICE 2,578,131

COMBINATION EARTH SCRAPER AND SCARIFIER

Roy C. Gannon, Rivera, Calif.

Application April 5, 1948, Serial No. 18,907

5 Claims. (Cl. 37—145)

This invention relates to an earth working tool for use with a tractor or other mobile power unit. More specifically the invention relates to a multipurpose device of this type which finds particular application in grading, landscaping, or the like.

The apparatus of the invention comprises a supporting bracket including means for attachment to a tractor or other mobile power unit and spaced parallel arms projecting rearwardly therefrom (rearwardly with respect to the tractor). A double edged scraping blade is rotatably mounted between the arms of the bracket and a plurality of teeth are detachably affixed to the back of the blade and rotatable therewith.

A feature of the apparatus of the invention is its flexibility of use in that it may be alternately used to scarify, scrape, carry, doze or level. Adjustment to various positions to accomplish these different functions may be performed by the tractor driver by manipulation of locking means hereinafter described, without dismounting from the tractor. This latter feature is a big advantage from a time saving standpoint.

Another feature of the invention is the rigid and removable mounting of the teeth to the back of the scraping blade. In a preferred embodiment of the invention this mounting is accomplished by means of a scarifier bar rigidly affixed to the back of the blade and so constructed that the ripping teeth detachably mounted to the bar will rotate with the blade. In this manner the teeth and blade are cooperatively related to function either independently or in cooperation depending upon the operation to be performed. This is in turn a function of the position of the apparatus as controlled by the tractor driver.

To permit rotation of the ripping teeth with the blade, means are provided for holding the teeth in the scarifier bar irrespective of the relative position of the teeth with respect to the ground. As a further advantage this last named means is preferably adapted to hold all of the teeth in the scarifier in readily detachable relationship and to permit removal of all of the teeth by a single operation.

The foregoing and other features of the invention will be more clearly understood from the following detailed description thereof based on the accompanying drawings in which:

Fig. 4 is a side elevation of the apparatus showing it in a different position than that illustrated in Figs. 1 and 2; and Fig. 5 is a side elevation showing the device in still a third position.

Figure 1:
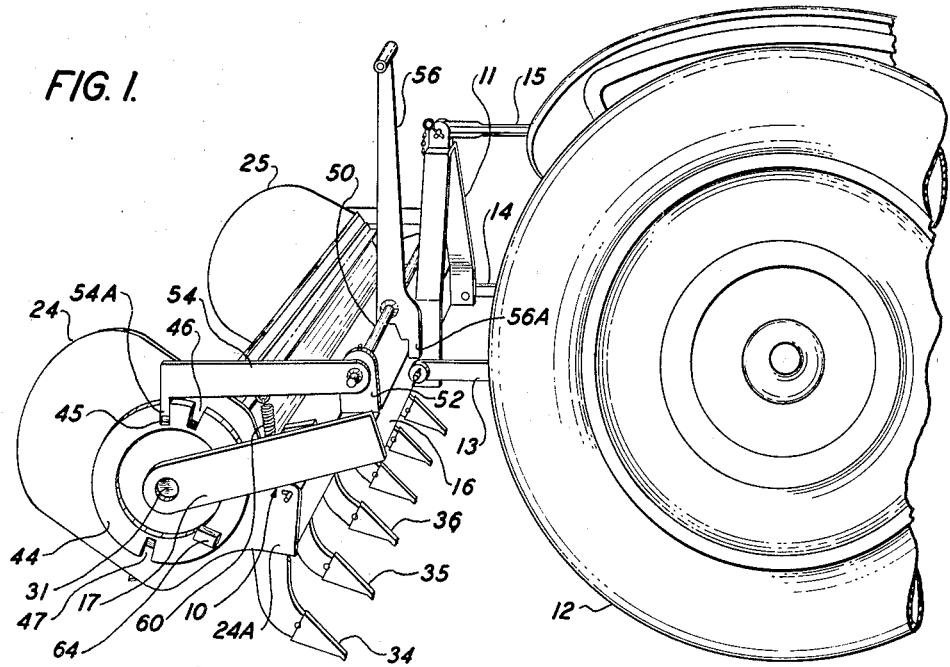
Fig. 1 is a perspective view of the apparatus as it appears attached to the rear end of a conventional tractor.
Figure 2:
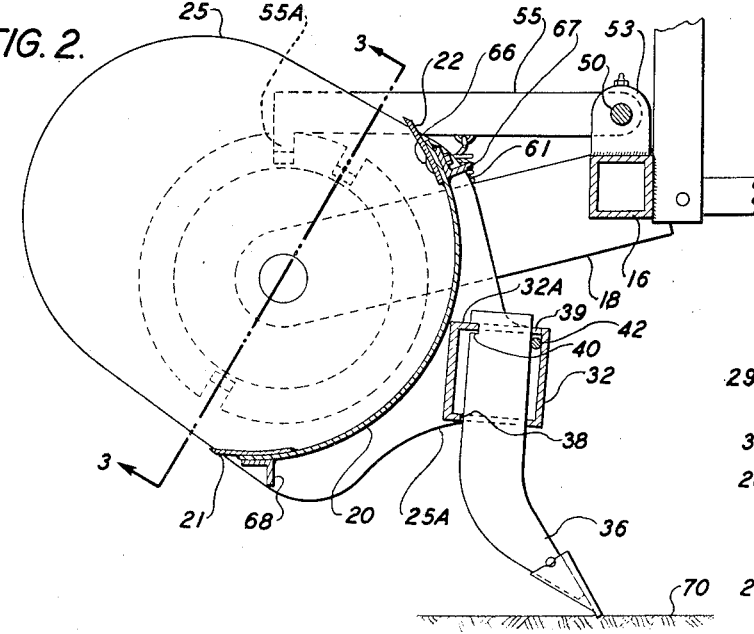
Fig. 2 is a sectional elevation of the device in the position shown in Fig. 1.
Figure 3:
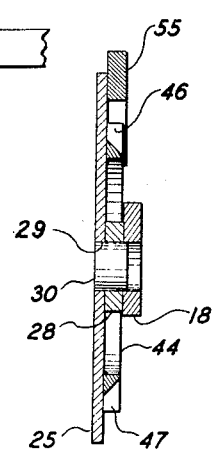
Fig. 3 is a sectional elevation taken on the line 3—3 of Fig. 2.

Referring to Figs. 1, 2 and 3 the apparatus of the invention comprises a bracket 10 having an upwardly extending yoke 11 and adapted to be affixed to a tractor 12 by draw bars 13, 14 and a top link 15. The means of attaching the apparatus to the tractor is conventional with equipment of this type.

The bracket 10 comprises the transverse member 16 which, in the embodiment shown, comprises a square tube and rearwardly extending arms 17, 18. The member 16 may be a square tube as shown or alternatively may be a pair of angle members joined together in the form of a square tube or any other type or shape of comparatively rigid structural material.

A curvilinear blade 20 provided with two cutting edges 21 and 22 has wings 24 and 25 rigidly affixed to the ends thereof. The blade 20 and the wings 24, 25 form a bucket which is used in the manner hereinafter described.

Each of the wings is provided with a socket in which the hubs of the arms 17, 18 of the bracket 10 are journaled. Thus as shown in Fig. 3 the wing 25 has an annular boss 28 affixed to its outer surface and the support arm 18 has an inwardly projecting hub 30 journaled in the socket 29 centrally located with respect to the annular boss in the end plate 25. In assembling the apparatus the hub 30 is welded to the support arm 18 after the blade is disposed between the support arms and while the hub is housed within the socket in the end plate. It is thus impossible for the blade to jar free of the bracket 10.

Each of the wings 24, 25 has a projection 24A, 25A, respectively extending beyond the convex surface of the blade 20 and a scarifier bar 32 is rigidly mounted between these extending projections. The scarifier bar 32 comprises a square tubular housing having a plurality of vertically aligned slots in the bottom and upper wall thereof. The ripping blades 34, 35, 36, etc., are mounted in the scarifier bar through the slots in the manner shown in Fig. 2.

Referring to Fig. 2 the scarifier bar 32 has a slot 38 in its lower wall and a vertically aligned slot 39 in its upper wall. The slot 38 is substantially centered with respect to the side walls of the scarifier bar and the slot 39 is displaced towards the right hand wall (as viewed in Fig. 2) so as to leave an inwardly extending lip 32A. The ripping tooth 36 is notched in its trailing edge (with reference to the ripping position) adjacent the upper end of the tooth. Thus in Fig. 2 the tooth 36 is notched at 40 and when inserted through the slots 38, 39 in the scarifier bar 32 the notch 40 hooks over the lip 32A. All of the ripping teeth 34, 35, 36, etc., are mounted in the scarifier bar in the same fashion and are held therein by a single keeper rod 42 which is journaled through the extensions 24A, 25A of the wings. The keeper bar 42 serves to prevent displacement of the notched edge of each of the blades away from the engaging lip thus holding the blades rigidly within the scarifier bar regardless of the position of the bar with respect to the ground. When it is desired to replace the teeth 34, 35, 36 or to remove them for sharpening or the like the keeper rod is merely withdrawn from the scarifier bar and each of the teeth may be simply dislodged. This means of mounting the ripping teeth with only a single keeper rod, facilitates removal and insertion of the entire set of teeth.

To control the angular displacement of the blade, wings, and teeth with respect to the bracket 10 an annular locking ring or boss is affixed to the outer face of each of the wings 24, 25. Thus the outer face of the wing 24 is provided with an annular boss 44 concentrically mounted with relation to hub 31 and provided with a series of radial notches 45, 46 and 47. A locking rod 50 is rotatably mounted above the transverse member 16 of the bracket 10 by means of supports 52, 53 affixed to the transverse rod 16 and extending upwardly therefrom. Rearwardly extending dogs 54, 55 are mounted on the opposite ends of the locking rod 50, each dog being provided with pawl 54A, 55A respectively adapted to engage in the notches in the annular locking rings 28 and 44. The lever arm 56 rigidly mounted to the locking rod 50 and extending upwardly therefrom provides means for releasing the dogs 54, 55 from the notches in the locking ring. The lever arm 56 is so positioned that it is readily accessible to the tractor driver. The lever arm 56 is provided with a downwardly extending stop 56A which by abutting against the transverse member 16 prevents excessive rotation of the lever arm 56 and consequently of the dogs 54, 55. To insure that the locking notches 45, 46, 47 and the similar locking notches in the locking ring 28 do not become clogged with dirt so as to interfere with the operation of the dogs 54, 55 the bottoms of these notches are tapered inwardly (with respect to the axis of rotation) towards the outer face of the locking rings. Thus any pressure exerted on dirt caked in one of the notches by the pawl on the end of the dog will effectively force the dirt out of the notch.

Each of the dogs 54, 55 is spring loaded with respect to its adjacent bracket arm by means of the springs 60, 61 respectively. Thus as the blade mechanism is rotated in the manner hereinafter described the dogs will automatically engage in the next notch aligned therewith unless prevented from doing so by manipulation of the lever arm 56.

A stop 64 affixed to the outer face of the annular locking ring serves to prevent counter-clockwise rotation of the blade mechanism (with reference to Fig. 1) to such a point as to cause the ripping teeth to impinge against the tractor tires.

Cutting edge 22 receives by far the greatest amount of wear and for this reason is removably attached to the blade 20 by means of a series of bolts 66 projecting through the blade and through an angle reinforcing member 67 running along the back of the blade adjacent the edge thereof. The cutting edge 21 acts more as a dozing or leveling blade and thus may be permanently affixed to the blade 20. A reinforcing member 68 is also affixed to the blade 20 along the edge adjacent the cutting edge 21.

The various operating positions of the apparatus are illustrated in Figs. 1, 4 and 6 as determined by the positioning of the notches in the locking ring.

In the positions shown in Figs. 1 and 2 with the dog 54 disposed in the notch 45 the apparatus is in ripping or scarifying position with respect to the ground 70. In this position neither of the cutting edges 21 nor 22 is in contact with the ground.

In Fig. 4 the apparatus is shown in the leveling or dozing position. In this position the blade is rotated through an angle of approximately 20° from the positions shown in Figs. 1 and 2 and the convex face of the blade faces forwardly with respect to the tractor. For leveling purposes the device is pulled toward the right with respect to Fig. 4 whereby the cutting edge 21 serves to level the ground as it is dragged over it. For dozing purposes the blade is pushed toward the left with respect to Fig. 4 and the cutting edge 21 serves as a scraper for the bucket formed by the curvilinear blade and the two wings 24, 25.

For scraping the blade is rotated through 180° from the position shown in Fig. 4 so that the dog 54 is engaged in the notch 47. In this position as shown in Fig. 5 the scraping blade 22 is in contact with the ground and the concave surface of the blade 20 (not shown) faces the tractor. The blade 20 and the wings 24, 25 forming a bucket as above described permits moving dirt in amounts determined by the power of the tractor.

Most conveniently the apparatus of the invention is affixed in the manner shown in Fig. 1 to a tractor or similar device having a conventional hydraulic lift. In such arrangement the device may be raised off the ground for rotating it from one position to the other. The center of gravity is such that when free to move at will the blade will come to rest at the position shown in Fig. 4. The change from this position to either of the other positions shown in Figs. 1 and 5 may be accomplished manually or the device may be lowered so as to just touch the ground. With the dogs disengaged, forward or backward motion of the tractor will cause the blade to rotate in the desired direction so as to align either of notches 45 or 47 with the dog.

I claim:

1. Multi-purpose earth working apparatus for use with a mobile power unit which comprises a support adapted for attachment to the power unit, a pair of rearwardly extending arms fixed to the support, a trough-shaped double edged blade rotatably mounted on its longitudinal axis between the arms, wings fastened respectively to the ends of the blade and extending transversely thereof in the direction of the concave side of the blade, a set of scarifying teeth mounted adjacent the convex side of the blade and extending outwardly therefrom and so disposed that they are above the bottom of the blade when the latter is in a relatively upright position, means for locking the blade when it has been rotated to an inclined position to permit the teeth to extend below it, means for locking the blade in an approximate upright position with its concave face forward and means for locking the blade in an approximately upright position with its concave face rearward.

2. Multi-purpose earth working apparatus for use with a mobile power unit which comprises a support adapted for attachment to the power unit, a pair of rearwardly extending arms fixed to the support, a trough-shaped double edged blade rotatably mounted on its longitudinal axis between the arms, wings fastened respectively to the ends of the blade and extending transversely thereof in the direction of the concave side of the blade, the top and bottom edges of the wings being substantially straight and substantially perpendicular to a line joining the edges of the blade, a set of scarifying teeth mounted adjacent the convex side of the blade and extending outwardly therefrom and so disposed that they are above the bottom of the blade when the latter is in a relatively upright position, means for locking the blade when it has been rotated to an inclined position to permit the teeth to extend below it, means for locking the blade in an approximate upright position with its concave face forward and means for locking the blade in an approximately upright position with its concave face rearward.

3. Multi-purpose earth working apparatus for use with a mobile power unit which comprises a support adapted for attachment to the power unit, a pair of rearwardly extending arms fixed to the support, a trough-shaped double edged blade rotatably mounted on its longitudinal axis between the arms, wings fastened respectively to the ends of the blade and extending transversely thereof on both sides of the blade, a cross member fastened rigidly to the wings and extending between them on the convex side of the blade, a set of scarifying teeth mounted in the cross member adjacent the convex side of the blade and extending outwardly therefrom and so disposed that they are above the bottom of the blade when the latter is in a relatively upright position, means for locking the blade when it has been rotated to an inclined position to permit the teeth to extend below it, means for locking the blade in an approximate upright position with its concave face forward and means for locking the blade in an approximately upright position with its concave face rearward.

4. Multi-purpose earth working apparatus for use with a mobile power unit which comprises a support adapted for attachment to the power unit, a trough-shaped double edged blade rotatably mounted on its longitudinal axis between the arms, wings fastened respectively to the ends of the blade and extending transversely thereof on both sides of the blade, but extending further in the direction of the concave side of the blade, a set of scarifying teeth mounted adjacent the convex side of the blade and extending outwardly therefrom and so disposed that they are above the bottom of the blade when the latter is in a relatively upright position, means for locking the blade when it has been rotated to an inclined position to permit the teeth to extend below it, means for locking the blade in an approximate upright position with its concave face forward and means for locking the blade in an approximately upright position with its concave face rearward.

5. Multi-purpose earth working apparatus for use with a mobile power unit which comprises a support adapted for attachment to the power unit, a pair of rearwardly extending arms fixed to the support, a trough-shaped double edged blade rotatably mounted on its longitudinal axis between the arms, wings fastened respectively to the ends of the blade and extending transversely thereof in the direction of the concave side of the blade, a set of scarifying teeth mounted adjacent the convex side of the blade and extending outwardly therefrom and so disposed that they are above the bottom of the blade when the latter is in a relatively upright position, a catch for locking the blade when it has been rotated to an inclined position to permit the teeth to extend below it, a catch for locking the blade in an approximate upright position with its concave face forward, a catch for locking the blade in an approximately upright position with its concave face rearward, said catches being mounted around the axis of rotation of the blade adjacent a wing, and a lever hinged to the support and having a free end for engaging any of the catches.

ROY C. GANNON.

REFERENCES CITED

The following references are of record in the file of this patent:

UNITED STATES PATENTS

| Number | Name | Date |
|---|---|---|
| 902,139 | Eady | Oct. 27, 1908 |
| 1,732,892 | Hinds | Oct. 22, 1929 |
| 1,829,728 | Beatty et al. | Nov. 3, 1931 |
| 1,861,762 | Terhaar | June 7, 1932 |
| 2,034,141 | Gustafson | Mar. 17, 1936 |
| 2,074,601 | Wells | Mar. 23, 1937 |
| 2,092,311 | Hosmer et al. | Sept. 7, 1937 |
| 2,297,677 | Forte | Oct. 6, 1942 |
| 2,362,407 | Ruddock | Nov. 7, 1944 |
| 2,433,019 | Arps | Dec. 23, 1947 |

FOREIGN PATENTS

| Number | Country | Date |
|---|---|---|
| 2,492 | Great Britain | 1901 |